(12) United States Patent
Youssef et al.

(10) Patent No.: US 11,090,837 B2
(45) Date of Patent: Aug. 17, 2021

(54) PROCESS FOR THE PRODUCTION OF AN ELASTOMER AGGLOMERATE COMPOSITION

(71) Applicant: SABIC GLOBAL TECHNOLOGIES B.V., Bergen op Zoom (NL)

(72) Inventors: Ahmed Abouelfetouh Youssef, Mount Vernon, IN (US); Vern Lowry, Geleen (NL); Dane Ferraris, Geleen (NL); Jianhua Xu, Geleen (NL)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 136 days.

(21) Appl. No.: 16/466,507

(22) PCT Filed: Dec. 6, 2017

(86) PCT No.: PCT/EP2017/081625
§ 371 (c)(1),
(2) Date: Jun. 4, 2019

(87) PCT Pub. No.: WO2018/104362
PCT Pub. Date: Jun. 14, 2018

(65) Prior Publication Data
US 2020/0061869 A1    Feb. 27, 2020

(30) Foreign Application Priority Data

Dec. 9, 2016   (EP) .................................. 16203181

(51) Int. Cl.
| | | |
|---|---|---|
| *B29B 9/08* | (2006.01) | |
| *B29B 9/12* | (2006.01) | |
| *C08C 1/065* | (2006.01) | |
| *C08F 279/04* | (2006.01) | |
| *C08F 279/06* | (2006.01) | |
| *B29K 9/06* | (2006.01) | |
| *B29K 55/02* | (2006.01) | |

(52) U.S. Cl.
CPC ................. *B29B 9/08* (2013.01); *B29B 9/12* (2013.01); *C08C 1/065* (2013.01); *C08F 279/04* (2013.01); *C08F 279/06* (2013.01); *B29K 2009/06* (2013.01); *B29K 2055/02* (2013.01)

(58) Field of Classification Search
None
See application file for complete search history.

(56) References Cited

U.S. PATENT DOCUMENTS

| | | | | |
|---|---|---|---|---|
| 2,304,689 A | * | 12/1942 | Hanson | B01F 5/068 138/42 |
| 2,817,500 A | | 12/1957 | Robinson | |
| 2,914,086 A | * | 11/1959 | Beller | F16K 31/408 55/309 |
| 3,573,246 A | * | 3/1971 | Bennet | C08C 1/065 523/335 |
| 3,793,403 A | * | 2/1974 | Dalton et al. | C08L 25/12 525/261 |
| 4,135,829 A | * | 1/1979 | Grillo | B01F 5/068 138/42 |
| 4,336,355 A | * | 6/1982 | Wu | C08F 279/04 525/260 |
| 4,680,321 A | * | 7/1987 | Graham | C08C 1/07 523/335 |
| 5,395,569 A | | 3/1995 | Badertscher et al. | |
| 5,677,368 A | * | 10/1997 | Dunn | C08C 1/075 523/335 |
| 6,080,803 A | | 6/2000 | Claassen et al. | |
| 10,843,144 B2 | | 11/2020 | Li et al. | |
| 2020/0238571 A1 | | 7/2020 | Ferraris et al. | |

FOREIGN PATENT DOCUMENTS

| | | | |
|---|---|---|---|
| EP | 1647558 A1 | | 4/2006 |
| GB | 755130 | | 8/1956 |
| GB | 976212 | * | 11/1964 |
| GB | 1039727 | * | 8/1966 |
| JP | 1180208 A | | 3/1999 |
| JP | H11-80208 | * | 3/1999 |
| WO | 02081068 A1 | | 10/2002 |

OTHER PUBLICATIONS

APV Homogenizers Rannie and Gaulin brouchure, 2008, SPX Corporation (Year: 2008).*
Gaulin Homogenizer, gaulinhomogenizer.com, accessed Dec. 30, 2020, no date.*
European Search Report for European Application No. 16203181.9, International Filing Date Dec. 6, 2017, 2 pages.
International Search Report for International Application No. PCT/EP2017/081625, International Filing Date Dec. 6, 2017, dated Feb. 2, 2018, 5 pages.
Written Opinion for International Application No. PCT/EP2017/081625, International Filing Date Dec. 6, 2017, dated Feb. 2, 2018, 5 pages.

* cited by examiner

*Primary Examiner* — Mary Lynn F Theisen

(74) *Attorney, Agent, or Firm* — Cantor Colburn LLP

(57) ABSTRACT

A process for the production of an elastomer agglomerate composition wherein the process comprises the steps in this order: (a) providing a slurry comprising elastomeric particles having an average particle size of ≤150 nm in water; and (b) forcing the slurry from (a) through an aperture at a flow velocity of at least 500 m/s. The elastomer agglomerate compositions produced via such process demonstrate a particularly desirable high average particle size.

18 Claims, 3 Drawing Sheets

_US 11,090,837 B2_

PROCESS FOR THE PRODUCTION OF AN ELASTOMER AGGLOMERATE COMPOSITION

CROSS REFERENCE TO RELATED APPLICATIONS

This application is a 371 of International Application No. PCT/EP2017/081625, filed Dec. 6, 2017, which is incorporated by reference in its entirety, and which claims priority to European Application Serial No. 16203181.9, filed Dec. 9, 2016.

FIELD OF DISCLOSURE

The present invention relates to a process for the production of an elastomer agglomerate composition. The invention also relates to an elastomer agglomerate composition. The invention further relates to thermoplastic copolymers produced using such elastomer agglomerate composition. The elastomer agglomerate composition according to the invention demonstrates a bimodal particle size distribution profile having a peak at a particle size higher than the average particle size.

BACKGROUND

In the field of thermoplastic copolymers, certain copolymers comprising one or more elastomeric phase(s) and one or more thermoplastic phase(s) are known to have significant commercial and technical value. The presence of such multiple phases provides a means for introduction of desirable properties of the materials present in each of the phases into a single polymeric system. Such copolymers may have a very desirable balance of properties, rendering them useful for conversion into a wide variety of applications. For example, such copolymers may exhibit a desirable balance of material properties such as: mechanical properties, including a desirable impact strength, tensile strength and flexural modulus; thermal properties such as heat deflection temperature; processing properties such as mouldability via injection moulding; and optical properties such as surface gloss and scratch resistance.

Such copolymers comprising one or more elastomeric phase(s) and one or more thermoplastic phase(s) may for example be core-shell copolymers. In the context of the present invention, core-shell copolymers may be understood to be copolymers comprising elastomeric particles dispersed in a matrix of a thermoplastic material, in particular copolymers comprising elastomeric particles dispersed in a matrix of a thermoplastic material where a certain portion of the thermoplastic material is chemically bound to the surface of the elastomeric particles.

Such core-shell copolymers may for example be produced by reacting certain elastomeric particles with certain monomers, in which the monomers both react to form a thermoplastic material as well as react with the elastomeric particles to form polymeric structures of the thermoplastic material that are chemically bound to the elastomeric particles. This ensures that the thermoplastic material forming a thermoplastic phase is compatible with the elastomeric phase. Such compatibility may be understood as to allow for melt processing without phase separation of the elastomeric phase(s) and the thermoplastic phase(s) taking place.

A well-known type of a core-shell copolymers that may be produced using elastomeric particles according to the present invention are acrylonitrile-butadiene-styrene copolymers, further also referred to as ABS copolymers. Such ABS copolymers may be produced by for example emulsion polymerisation processes where polybutadiene particles act as the elastomeric particles, which may react with a mixture comprising monomers including styrene and acrylonitrile to form an ABS copolymer.

Other examples of such core-shell copolymers include methacrylate butadiene styrene copolymers, acrylonitrile styrene butylacrylate copolymers, and styrene butylacrylate copolymers.

In order to achieve the desired balance of material properties of such core-shell copolymers, it is desirable that the elastomeric particles that are used in the production process of the core-shell copolymers have a certain particle size. For example, it is particularly desirable that the elastomeric particles have an average particle size of ≥150 nm, or ≥250 nm, such as ≥150 and ≤1000 nm or ≥250 and ≤1000 nm. It is even more particularly desirable that the elastomeric particles have an average particle size of ≥200 nm and ≤500 nm, or ≥250 nm and ≤400 nm. In the context of the present invention, the average particle size may be understood to be the $D_{50}$ particle size as determined in accordance with ISO 9276-2:2014. However, the processes for production of elastomers, such as for example polybutadiene, poly(styrene-butadiene), poly(acrylonitrile butadiene) and poly(butyl acrylate) commonly result in elastomeric particles having an average particle size that is below such desired average particle size, for example below 150 nm or even below 100 nm.

Therefore, in order to obtain the elastomeric particles having the desirable average particle size for use in the production of core-shell copolymers such as ABS copolymers, there is a need to modify the elastomeric particles obtained from the processes for production of such elastomeric particles in a way that the average particle size is increased.

There are several known methods of increasing the average particle size of such elastomeric particles. For example, the elastomeric particles may be subjected to a further polymerisation step using the monomer(s) that were used to form the initial elastomeric particles. This is known as the direct-growth approach. A disadvantage of this method is that the polymerisation time that is required to produce elastomeric particles having the desired average particle size for use in the production of core-shell copolymers according to the present invention is significantly longer.

A further method is by chemical agglomeration, such as by reacting the initial elastomeric particles with a chemical, for example acrylic acid, to produce chemically agglomerated elastomeric particles. However, a disadvantage of this method is that it may introduce impurities that may effect that final properties of the core-shell copolymers.

A third method to achieve elastomeric particles having a desired average particle size is by way of pressure agglomeration, wherein the initial elastomeric particles are subjected to a pressure of such nature that particles fuse to form an elastomeric agglomerate composition. Such method can be relatively fast, and does not introduce any further impurities into the elastomeric particles. It is therefore a desirable method to increase the average particle size of elastomeric particles, particularly for the purpose of providing elastomeric particles suitable for use in the production of core-shell copolymers according to the present invention, such as ABS copolymers.

A disadvantage of the pressure agglomeration method however is that the average particle size of the elastomer agglomerates that are obtained using such pressure agglomeration method is difficult to control. There are a variety of parameters, including pressure, temperature, slurry composition and the fraction of solid material in the material stream that is subjected to pressure agglomeration, that may vary and influence the average particle size of the elastomer agglomerates.

For that reason, there is a need for development of a process for agglomeration to form an elastomer agglomerate composition in which the average particle size of the elastomer agglomerates can be controlled to provide a product of consistent average particle size.

BRIEF SUMMARY

In an aspect, a process for the production of an elastomer agglomerate composition wherein the process comprises the steps in this order: (a) providing a slurry comprising elastomeric particles having an average particle size of ≤150 nm in water; and forcing the slurry from (a) through an aperture at a flow velocity of at least 500 m/s.

DETAILED DESCRIPTION

Figure 1:
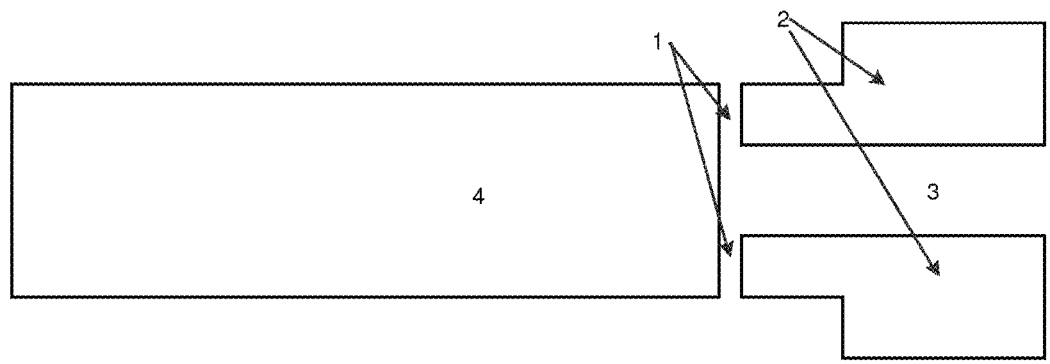
FIG. 1 is an illustration of a cross-section of a valve assembly comprising an aperture (1), a seat (2), a flow channel (2) and a valve (4)

This has now been provided according to the present invention by a process for the production of an elastomer agglomerate composition wherein the process comprises the steps in this order:
(a) providing a slurry comprising elastomeric particles having an average particle size of ≤150 nm in water; and
(b) forcing the slurry from (a) through an aperture at a flow velocity of at least 500 m/s.

The elastomer agglomerate compositions produced via such process demonstrate a particularly desirable high average particle size. Furthermore, such compositions demonstrate a desirable particle size distribution for use of the production of elastomer-reinforced thermoplastic copolymers such as ABS copolymers.

The elastomeric particles used in the process of the present invention may for example be selected from polybutadiene particles, poly(styrene butadiene) particles, poly(acrylonitrile butadiene) particles, or polybutylacrylate particles. The elastomeric particles may preferably have an average particle size of ≤125 nm or even more preferably ≤100 nm. Use of such elastomeric particles has an advantage in that the need for lengthy polymerisation of the monomers to obtain the elastomeric particles is avoided.

The slurry that is used in the process according to the present invention may comprise ≥20 wt % of elastomeric particles, preferably ≥20 wt % and ≤70 wt %, more preferably ≥30 wt % and ≤60 wt %, even more preferably ≥30 wt % and ≤50 wt %, with regard to the total weight of the slurry.

The slurry that is used in the process according to the present invention may comprise ≥20 wt % of elastomeric particles, preferably ≥20 wt % and ≤70 wt %, more preferably ≥30 wt % and ≤60 wt %, even more preferably ≥30 wt % and ≤50 wt %, with regard to the total weight of the slurry, wherein the elastomeric particles may for example be selected from polybutadiene particles, poly(styrene butadiene) particles, or polybutylacrylate particles.

Preferably, the slurry that is used in the process according to the present invention comprises ≥20 wt % of elastomeric particles, preferably ≥20 wt % and ≤70 wt %, more preferably ≥30 wt % and ≤60 wt %, even more preferably ≥30 wt % and ≤50 wt %, with regard to the total weight of the slurry, wherein the elastomeric particles are polybutadiene particles.

The slurry from (a) is preferably forced through the aperture at a flow velocity of at least 600 m/s, more preferably at least 700 m/s, such as at least 700 m/s and at most 1000 m/s.

The elastomer agglomerate composition according to the present invention comprises elastomer agglomerates. The composition may further comprise additional ingredients such a dispersing medium, for example water, and additives for ensuring the composition being in the form of an emulsion comprising the elastomer agglomerates, such as an aqueous emulsion. Such aqueous emulsion may also be referred to as a latex. Such latex produced according to the process of the present invention may for example be used in a further polymerisation process, such as in the production of elastomer-reinforced thermoplastic copolymers, such as graft copolymers, via emulsion polymerisation.

Such additives that may be present in the elastomer agglomerate composition produced according to the present invention may for example be selected from oleic acid, stearic acid, palmitic acid, tallow, tetrasodium pyrophosphate, potassium salts of dimer acids, sodium salts of dodecyl benzene sulfonic acid, or combinations thereof.

In the production of elastomer-reinforced thermoplastic copolymers, the introduction of such elastomer agglomerate composition commonly takes place during a polymerisation reaction. In order to be able to produce elastomer-reinforced thermoplastic copolymers via such polymerisation reaction, the average particle size of the elastomer agglomerate composition introduced to the polymerisation reaction is preferably ≥150 nm and ≤1000 nm, more preferably ≥200 nm and ≤500 nm, even more preferably ≥250 nm and ≤400 nm. Elastomer-reinforced thermoplastic copolymers produced using an elastomer agglomerate composition of such average particle size may provide a desired balance of properties such as a desired impact strength.

It is a further advantage of the process according to the present invention that the elastomer agglomerate composition that is obtained comprises a very low fraction of agglomerates having a small particle size. In particular, it is an advantage that the process of the present invention results in a low fraction of elastomer agglomerates having a particle size of <200 nm.

In a particularly advantageous embodiment of the invention, the elastomer agglomerate composition comprises <30 wt % of elastomer agglomerates having a particle size of <200 nm, with regard to the total weight of the elastomer agglomerates. Even more preferable, the elastomer agglomerate composition comprises <25 wt % of elastomer agglomerates having a particle size of <200 nm with regard to the total weight of the elastomer agglomerates.

Elastomer agglomerate compositions having such low fraction of elastomer agglomerates having a particle size of <200 nm are particularly suitable for the production of graft copolymers via emulsion polymerisation processes where thermoplastic polymer chains are graft polymerised onto the agglomerates as the copolymers produced via such process demonstrate a better impact strength than similar copolymers produced using elastomer agglomerate compositions having a larger fraction of elastomer agglomerates having a particle size of <200 nm. A too large fraction of small particles may also be detrimental for the processing stability of the graft copolymers.

It is further preferable for use of the elastomer agglomerate composition in the production of such graft copolymers that the composition comprise less than 0.02 wt % with regard to the total weight of the elastomer agglomerates of agglomerates having a particle size of >3000 nm. The presence of more than 0.02 wt % of such agglomerates having a particle size of >3000 nm provides a disadvantage in that the graft copolymer prepared using such composition does not demonstrate the desirable rheology. A too large fraction of large particles may be detrimental to the melt flow of the graft copolymer produced using the elastomer agglomerates. Further, a too large fraction of large particles may be detrimental for the opacity of the graft copolymer.

It is preferred that the elastomer agglomerate composition according to the present invention comprises less than 0.02 wt % with regard to the total weight of the elastomer agglomerates of agglomerates having a particle size of >3000 nm.

It is also preferred that the elastomer agglomerate composition according to the present invention comprises ≤10.0 wt %, even more preferably ≤5.0 wt %, with regard to the total weight of the elastomer agglomerates, of agglomerates having a particle size of >1000 nm.

It is also preferred that the elastomer agglomerate composition according to the present invention comprises ≤5.0 wt %, even more preferably ≤1.0 wt %, with regard to the total weight of the elastomer agglomerates, of agglomerates having a particle size of >1500 nm.

It is particularly preferred that that the elastomer agglomerate composition according to the present invention comprises ≥60.0%, even more preferably ≥65.0 wt % or ≥70.0 wt %, with regard to the total weight of the elastomer agglomerates, of agglomerates having a particle size of >200 nm and ≤1000 nm. Such composition demonstrates a desirable narrow molecular weight distribution that is beneficial to provide both the desired material properties as well as to demonstrate the desired processability properties.

Particular preferred elastomers are butadiene rubbers, also referred to as BR, or styrene-butadiene rubbers, also referred to as SBR. Further particularly preferable, the elastomers are butadiene rubbers.

It is preferred according to the present invention that the elastomeric particles account for at least 90.0 wt % of the total weight of solid ingredients in the slurry. More preferably, the elastomeric particles account for at least 95.0 wt % of the total weight of solid ingredients in the slurry, even more preferably for at least 98.0 wt %. Even further preferred is an embodiment wherein the elastomeric particles form the sole source of solid ingredients in the slurry.

Such slurry composition particularly allows for formation of elastomeric agglomerates according to the process of the present invention having a desired high average particle size, in particular having a particle size distribution as according to example 2 below, exemplified in FIG. 3, having, when considering increase of particle size, first a shoulder at a particle size which is lower than the average particle size of the elastomeric agglomerates, and a highest peak at a particle size which is higher than the average particle size.

The step (b) of the present invention, involving forcing the slurry comprising the elastomer particles through an aperture, may be performed using a valve assembly.

An exemplary embodiment of a valve assembly that may be used in certain embodiments of the present invention is presented in FIG. 1. FIG. 1 shows a cross-section of a valve assembly comprising an aperture (1), a seat (2), a flow channel (3) and a valve (4). The seat (2) comprises a central opening that forms the flow channel (3). In a particular embodiment of the process, the slurry is introduced to the valve via the flow channel (3) and flows towards the aperture (1). The slurry is introduced at a certain pressure. For example, the slurry may be introduced at a pressure of ≥40 MPa, preferably ≥50 MPa. The slurry may for example be introduced at a pressure or ≤80 MPa, preferably ≤70 MPa, more preferably ≤60 MPa. For example, the slurry may be introduced at a pressure of ≥40 and ≤80 MPa, preferably ≥40 and ≤70 MPa, more preferably ≥40 and ≤60 MPa, even more preferably ≥50 and ≤60 MPa.

The slurry may be an aqueous dispersion. In order to ensure a certain desired flow velocity when the slurry passed the aperture (1), the valve must be subjected to a certain pressure to achieve a certain desired flow velocity of the slurry in the aperture (1).

In the process according to the invention, the material flow through the aperture may be confined by a flat first surface and a flat second surface together forming a channel.

Figure 2:
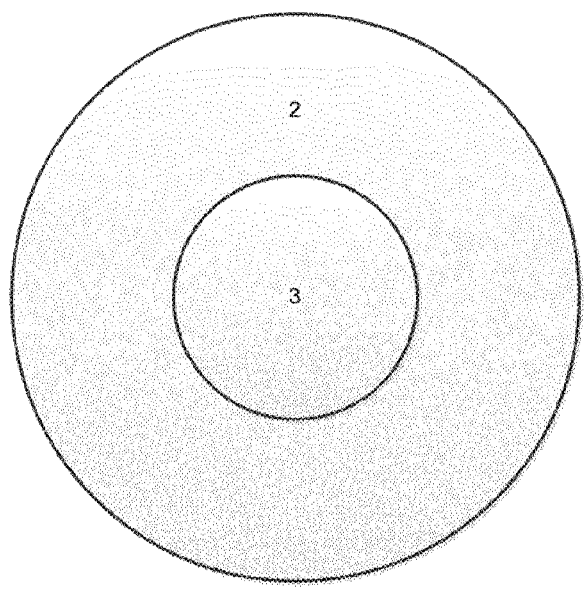
FIG. 2 is an illustration of a seat (2) being a circular seat comprising a circular aperture forming the flow channel (3)

A front view of the seat (2) is presented in FIG. 2. FIG. 2 shows a seat (2) being a circular seat comprising a circular aperture forming the flow channel (3). It is preferred that the seat is a circular seat comprising a circular opening.

In a particular embodiment of the invention, the process is performed using a valve assembly comprising the aperture (1), the valve assembly further comprising a seat (2), a flow channel (3) through which the slurry flows at a certain pressure towards the aperture (1), and a valve (4) subjected to a pressure in the direction opposite the flow direction of the slurry, wherein the seat (2) comprises a central opening forming the flow channel (3), and wherein the valve pressure and the pressure of the slurry are arranged such that the slurry is forced through the aperture (1) at a flow velocity of at least 500 m/s, preferably of at least 600 m/s, more preferably at least 700 m/s, such as at least 700 m/s and at most 1000 m/s. For example, the slurry may be forced through the aperture (1) at a flow velocity of at least 500 m/s and at most 1000 m/s, preferably at least 500 m/s and at most 800 m/s.

The present invention in one of its embodiments also relates to the use of the elastomer agglomerate composition in the production of acrylonitrile-butadiene-styrene copolymers, methacrylate butadiene styrene copolymers, acrylonitrile styrene butylacrylate copolymers, or styrene butylacrylate copolymers.

The present invention further also relates to an acrylonitrile-butadiene-styrene copolymer produced using the elastomer agglomerate composition according to the invention.

The invention will now be illustrated by the following non-limiting examples.

In an emulsion polymerisation process, a polybutadiene slurry was prepared by polymerisation of 1,3-butadiene via a free-radical polymerisation process in an aqueous environment. The polybutadiene particles in the slurry had an average particle size of about 80 nm. The slurry comprised 39.0 wt % of polybutadiene particles and 0.7 wt % of oleic acid.

The slurry was subjected to homogenisation at a temperature of 35° C. according to the process of the present invention. A flow of 2375 litres per hour of the slurry were supplied to a homogeniser. In example 1, the homogenisation was conducted at a velocity of 775 m/s in the aperture. In example 2, included for comparative purposes, the homogenisation was conducted at a velocity of 392 m/s. The pressure drop in both examples was 52 MPa.

The homogeniser valve was a valve as in FIG. 1.

The particle size distribution of the polybutadiene particles in the slurry obtained from the homogenisations was determined using a Beckman Coulter multi-wavelength laser diffraction particle size analyser type LS12 320.

The results of the particle size determination are presented in table II below. In FIG. 3, the values on the x axis represent the particle size in μm, and the values on the y axis represent the volume fraction of particles with regard to the total particle volume having a corresponding particle size in vol %.

TABLE II

| Example | Velocity (m/s) | Average particle size (μm) | Fraction <0.2 μm | Fraction 0.2-1.0 μm | Fraction >1.0 μm | Fraction >1.5 μm |
|---|---|---|---|---|---|---|
| 1 | 775 | 0.31 | 21.7 | 73.7 | 4.6 | 0.7 |
| 2 | 392 | 0.31 | 18.0 | 58.5 | 23.5 | 16.4 |

The fractions as presented in table II represent volume fractions in vol % of the polybutadiene particles in the slurry obtained from homogenisation. The velocity is the velocity of the slurry in the aperture 1 of the valve of FIG. 1.

The particle size distribution data as presented in table II demonstrates the process according to the present invention to result in a homogenised elastomer agglomerate composition having a more narrow particle size increased fraction of particles in the range of 0.2-1.0 μm. In particular, the homogenised elastomer agglomerate composition of example 1 comprised a far lower content of particles having a large particle size, as demonstrate by the low fraction of particles having a particle size of >1.5 μm.

Figure 3:
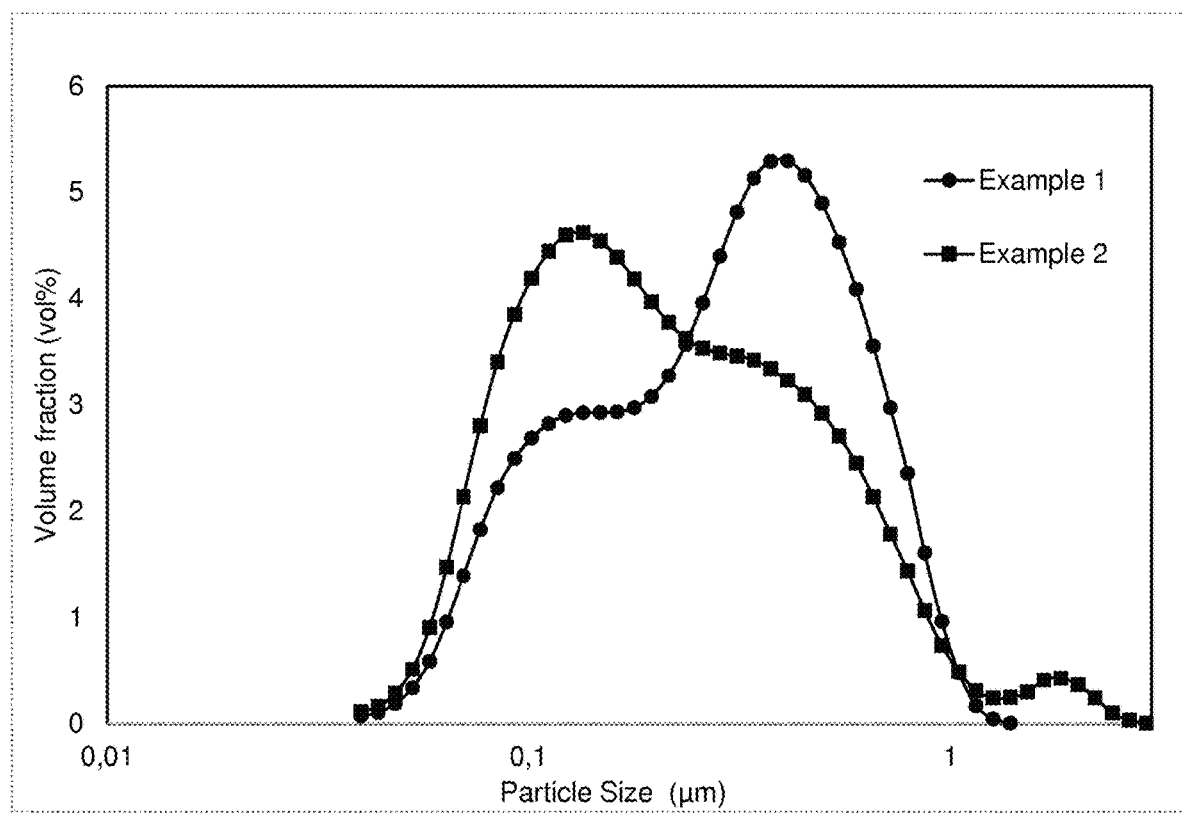
FIG. 3 graphical illustration of the particle size distributions of the polybutadiene particles in the homogenised slurries of examples 1 and 2.

FIG. 3 presents the particle size distributions of the polybutadiene particles in the homogenised slurries of examples 1 and 2. Both homogenised elastomer agglomerates demonstrated a bimodal particle size distribution. However, the particle size distribution of the homogenised elastomer agglomerate of example 1 showed a bimodal distribution having a shoulder corresponding to a first modus of the bimodal distribution at lower particle sizes and a peak corresponding to a second modus of the bimodal distribution at a higher particle size than the shoulder.

For example 2, this is the opposite. The peak is present at a lower particle size than the shoulder. From this it may be concluded that the homogenised elastomer agglomerate obtained in example 2, the comparative example, contains a larger fraction of polybutadiene particles that have not formed agglomerates. Further, there is a larger fraction of agglomerates in example 2 that have a larger particle size, as demonstrated by the presence of particles above 2 μm in FIG. 3.

The invention claimed is:

1. A process for the production of an elastomer agglomerate composition wherein the process comprises the steps in this order:
    (a) providing a slurry comprising elastomeric particles having an average particle size of ≤150 nm in water; and
    (b) forcing the slurry from (a) through an aperture at a flow velocity of at least 500 m/s.

2. The process according to claim 1, wherein the material flow through the aperture is confined by a flat first surface and a flat second surface together forming a channel.

3. The process according to claim 1, wherein the slurry is introduced at a pressure of ≥40 and ≤60 MPa.

4. The process according to claim 1, wherein the slurry comprises ≥20.0 wt % of elastomeric particles with regard to the total weight of the slurry.

5. The process according to claim 1, wherein the elastomeric particles are selected from polybutadiene particles, poly(styrene-butadiene) particles, poly(acrylonitrile butadiene) particles or polybutylacrylate particles.

6. The process according to claim 1, wherein the process is performed using a valve assembly comprising the aperture, the valve assembly further comprising a seat, a flow channel through which the slurry flows at a certain pressure towards the aperture, and a valve subjected to a pressure in the direction opposite the flow direction of the slurry, wherein the seat comprises a central opening forming the flow channel, and wherein the valve pressure and the pressure of the slurry are arranged such that the slurry is forced through the aperture at a flow velocity of at least 500 m/s.

7. The process according to claim 6, wherein the seat is a circular seat comprising a circular opening.

8. The process according to claim 1, wherein the slurry is forced through the aperture at a flow velocity of at least 700 m/s and at most 1000 m/s.

9. The process according to claim 1, wherein the elastomeric particles account for at least 98.0 wt % of the total weight of solid ingredients in the slurry.

10. An elastomer agglomerate composition produced according to the process of claim 1, wherein the elastomer agglomerate composition comprises less than 0.02 wt %, with regard to the total weight of the elastomer agglomerates in the elastomer composition, of agglomerates having a particle size of >3000 nm; and less than 30 wt % of elastomer agglomerates having a particle size of <200 nm, with regard to the total weight of the elastomer agglomerates.

11. The elastomer agglomerate composition according to claim 10, wherein the elastomer agglomerate composition comprises less than 25 wt % of elastomer agglomerates having a particle size of <200 nm, with regard to the total weight of the elastomer agglomerates.

12. The elastomer agglomerate composition according to claim 10, wherein the elastomer agglomerate composition comprises ≥60 wt % with regard to the total weight of the elastomer agglomerates, of agglomerates having a particle size of >200 nm and ≤1000 nm.

13. The elastomer agglomerate composition according to claim 10, wherein the elastomer agglomerate composition comprises ≤10.0 wt % of elastomer agglomerates having a particle size of >1000 nm, with regard to the total weight of the elastomer agglomerates.

14. The elastomer agglomerate composition according to claim 10, wherein the elastomer agglomerate composition comprises ≤1.0 wt % of elastomer agglomerates having a particle size of >1500 nm, with regard to the total weight of the elastomer agglomerates.

15. Acrylonitrile-butadiene-styrene copolymer produced using the elastomer agglomerate composition according to claim 10.

16. The process according to claim 1,
wherein the material flow through the aperture is confined by a flat first surface and a flat second surface together forming a channel;
wherein the slurry is introduced at a pressure of ≥40 and ≤60 MPa;
wherein the slurry comprises ≥20.0 wt % of elastomeric particles with regard to the total weight of the slurry; and
wherein the elastomeric particles are selected from polybutadiene particles, poly(styrene-butadiene) particles, poly(acrylonitrile butadiene) particles or polybutylacrylate particles.

17. The process according to claim 16, wherein the process is performed using a valve assembly comprising the aperture, the valve assembly further comprising a seat, a flow channel through which the slurry flows at a certain pressure towards the aperture, and a valve subjected to a pressure in the direction opposite the flow direction of the slurry, wherein the seat comprises a central opening forming the flow channel, and wherein the valve pressure and the pressure of the slurry are arranged such that the slurry is forced through the aperture at a flow velocity of at least 700 m/s and at most 1000 m/s.

18. The process according to claim 16, wherein the elastomeric particles account for at least 98.0 wt % of the total weight of solid ingredients in the slurry.

* * * * *